United States Patent
Debates et al.

(10) Patent No.: US 9,881,189 B2
(45) Date of Patent: Jan. 30, 2018

(54) SURFACE MATERIAL ENHANCEMENT WITH RADIO FREQUENCY IDENTIFICATION (RFID) TAGS

(71) Applicant: Motorola Mobility LLC, Chicago, IL (US)

(72) Inventors: Scott Debates, Crystal Lake, IL (US); Mary Hor-Lao, Chicago, IL (US); Douglas A Lautner, Round Lake, IL (US); Jagatkumar Shah, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/919,175

(22) Filed: Oct. 21, 2015

(65) Prior Publication Data

US 2017/0116445 A1    Apr. 27, 2017

(51) Int. Cl.
*G06K 7/10* (2006.01)
*G06K 9/00* (2006.01)
*G06K 19/07* (2006.01)

(52) U.S. Cl.
CPC ..... *G06K 7/10366* (2013.01); *G06K 7/10198* (2013.01); *G06K 9/00167* (2013.01); *G06K 19/0717* (2013.01)

(58) Field of Classification Search
CPC .......... G06K 9/00167; G06K 19/0717; G06K 7/10009; G06K 7/10366; G06K 7/10198
See application file for complete search history.

(56) References Cited

U.S. PATENT DOCUMENTS

| 2005/0099299 | A1* | 5/2005 | Tyroler | G06K 7/10079 340/572.1 |
|---|---|---|---|---|
| 2006/0289657 | A1* | 12/2006 | Rosenberg | G06K 19/07345 235/492 |
| 2007/0069021 | A1* | 3/2007 | Elrod | G06K 17/00 235/451 |
| 2007/0216531 | A1* | 9/2007 | Lee | G06K 17/00 340/572.1 |
| 2007/0290051 | A1* | 12/2007 | Bielmann | G06K 19/0716 235/492 |
| 2009/0230197 | A1* | 9/2009 | Tanner | G06K 19/07345 235/492 |
| 2010/0140361 | A1* | 6/2010 | Lee | G06K 19/07345 235/492 |

OTHER PUBLICATIONS

"Combined Search and Examination Report", GB Application No. 1615107.8, dated Feb. 27, 2017, 7 pages.

* cited by examiner

Primary Examiner — Thomas Alunkal

(57) ABSTRACT

In certain embodiments of surface material enhancement with radio frequency identification (RFID) tags, one or more RFID pressure assemblies are incorporated into a surface material. An RFID pressure assembly includes a pressure switch and an RFID tag. The RFID tag can be in an inactive state or in an active state. The RFID tag is generally in the inactive state, but the RFID tag is placed in the active state if a person applies pressure to the pressure switch. If the RFID tag is in the inactive state, the RFID tag fails to respond to an interrogation signal transmitted from an RFID reader. If the RFID tag is in the active state, the RFID tag responds to an interrogation signal by reflecting back a responsive signal. The responsive signal sent from the RFID tag may include a positional indicator of the RFID pressure assembly or an appliance control command.

20 Claims, 10 Drawing Sheets

SURFACE MATERIAL ENHANCEMENT WITH RADIO FREQUENCY IDENTIFICATION (RFID) TAGS

BACKGROUND

A person's location is used in a number of different contexts. For example, people use a smart phone for mapping purposes or to obtain precise, turn-by-turn navigational directions based on a current location. Additionally, a person's location can be used by stores or third-party marketing services to provide notifications of shopping or sales opportunities that are geographically-relevant to the person. In an outdoor scenario, a person's location can often be determined to a sufficiently accurate degree using the Global Positioning System (GPS) and an electronic device with a GPS capability. With an indoor navigational scenario, on the other hand, determining a person's location is usually more difficult because a building's roof and walls block a direct line-of-sight between the satellites of the GPS system and the electronic device.

One of the difficulties with indoor navigation entails installation and maintenance costs of infrastructure used to locate and then track or navigate a user within a building, such as a multi-floor office tower or a single-story dwelling. Current indoor location methods involve using Wi-Fi access point (AP) infrastructure and the motion sensors of an electronic device, such as an accelerometer or a compass. One challenge with using motion sensors is that various devices have sensors with different levels of accuracy. A challenge with using Wi-Fi signaling to determine a person's location is that Wi-Fi systems, and the access points thereof, are usually designed and setup for the purpose of data coverage and not to facilitate navigation. Consequently, conventional approaches to determining a person's location continue to be costly, imprecise, or both, especially in indoor environments.

BRIEF DESCRIPTION OF THE DRAWINGS

Embodiments of surface material enhancement with radio frequency identification (RFID) tags are described with reference to the following FIGS. The same numbers may be used throughout to reference like features or components that are shown in the FIGS..

DETAILED DESCRIPTION

Figure 1:
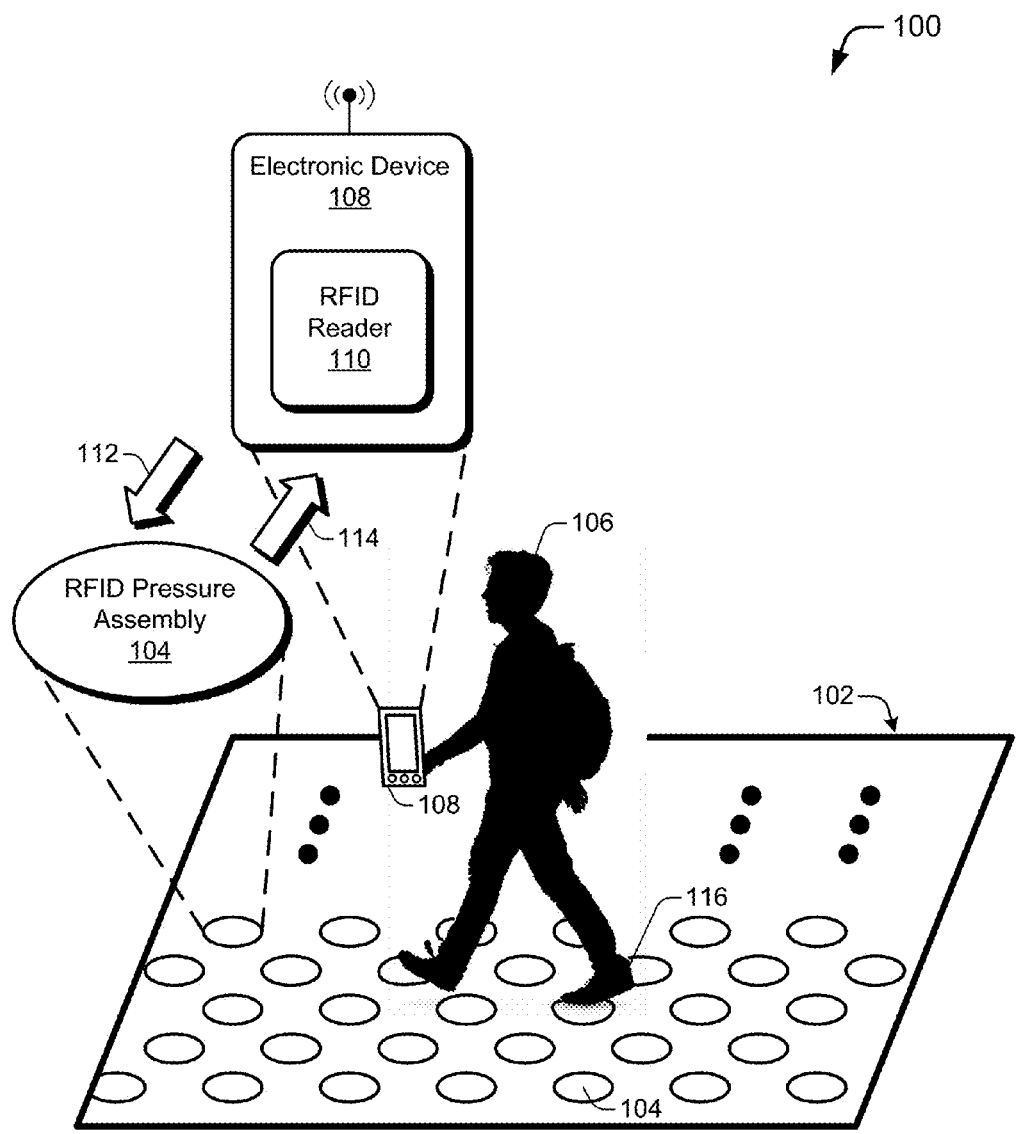
FIG. 1 illustrates a perspective view of an example environment including a surface material in which embodiments of surface material enhancement with RFID tags can be implemented.

Attempting to determine a person's indoor position with a conventional approach, such as by using multiple access points of a Wi-Fi system or multiple motion sensors of a smart phone, is expensive, inaccurate, or both. This limits the ability to provide navigational or other location-based services and features to users who are indoors.

To address these shortcomings of conventional approaches to indoor positioning, surface material enhancement with radio frequency identification (RFID) tags is described herein. In one or more embodiments, RFID tags are incorporated into a surface material, such as a flooring or wall surface material, and are configured to be generally inactive but to become active if a person applies pressure to the RFID tags, such as by stepping or pushing on one. If an RFID tag is in an inactive state, the RFID tag fails to respond to an interrogation signal transmitted from an RFID reader. If an RFID tag is in active state, on the other hand, the RFID tag responds to an interrogation signal by reflecting back a response signal. Hence, an RFID tag is capable of wirelessly providing information in response to an interrogation signal that is received from an RFID reader if the RFID tag is placed in an active state. The response signal sent from the RFID tag may include an indication of a position of the RFID tag or a command to control an appliance as described herein.

An RFID tag in conjunction with a pressure switch may be installed as an RFID pressure assembly as part of a surface material, such as a flooring or wall surface material. The RFID tag and the pressure switch are jointly configured such that the pressure switch maintains the RFID tag in the inactive state in an absence of pressure. If a person applies pressure to the RFID pressure assembly, such as by stepping on or pushing against the RFID pressure assembly, then the pressure switch causes the RFID tag to switch to the active state. Consequently, the RFID tag is responsive to an interrogation signal if the associated pressure switch is being pressed on by a person, but the RFID tag is unresponsive to the interrogation signal if the associated pressure switch is not being pressed on, or is not otherwise being subjected to a force that overcomes a biasing force, such as a spring mechanism.

In one or more embodiments for an example flooring environment that facilitates navigation, multiple RFID pressure assemblies are installed as part of a flooring surface material. For example, an underlayment formed from foam padding that includes multiple spaced-apart RFID pressure assemblies may be installed between a concrete or wooden subfloor and a flooring cover, such as carpet or vinyl. After installation, each RFID tag of each RFID pressure assembly may be programmed with a positional indicator. Examples of positional indicators include a room identifier, such as a room number; a distance, such as number of feet to a door; a building or map coordinate, such as one corresponding to place on an electronic map of the building; or some combination thereof.

Programming of an RFID pressure assembly may be accomplished by applying pressure to a pressure switch thereof and transmitting an interrogation signal to the associated RFID tag that instructs the RFID tag to store the positional indicator. Thereafter, the RFID tag may respond to an interrogation signal with a reflected response signal that includes the positional indicator if a person's foot or hand is pressing on the associated pressure switch. An RFID reader, or a smart phone that includes an RFID reader, may receive and process the positional indicator to provide a location-based service or feature to a user of the smart phone, such as navigational instructions to a desired room destination. The smart phone or other electronic device may also forward the positional indicator to the cloud to enable remote devices or third parties to provide location-based services. An RFID pressure assembly may alternatively be programmed with an appliance control command that is capable of changing an appliance setting of an appliance if the appliance control command is sent from the RFID pressure assembly.

Although features and concepts of surface material enhancement with RFID tags can be implemented with any number of different apparatuses, systems, environments, and/or configurations, embodiments of surface material enhancement with RFID tags are described in the context of the following example RFID pressure assemblies, apparatuses, systems, and methods. Moreover, although certain aspects may be described primarily in the context of a flooring surface material or a wall surface material, such aspects may be applicable in the other or in a different surface material context. For example, described aspects pertaining to pressure being applied by a person's foot on an RFID pressure assembly installed with a flooring surface material may be relevant to embodiments in which a person applies pressure with a hand on an RFID pressure assembly installed with a wall surface material, or vice versa.

FIG. 1 illustrates a perspective view of an example environment 100 including a surface material 102 in which embodiments of surface material enhancement with RFID tags can be implemented. Environment 100 further includes a person 106 and an electronic device 108. Incorporated into the surface material 102 are multiple RFID pressure assemblies 104. The multiple RFID pressure assemblies 104 are illustrated as being distributed over the surface material 102 in a regular, offset pattern. However, the RFID pressure assemblies 104 may instead be distributed in a regular, grid pattern; in a random pattern; in a striped pattern; in an irregular pattern; at constant spatial intervals; at varying spatial intervals; and so forth.

As shown for one or more example embodiments, the person 106 is walking over the surface material 102, which is illustrated as a flooring surface material 102 in FIG. 1 by way of example only. As the person 106 walks or stands on the surface material 102, the person 106 places at least one foot 116 on top of an RFID pressure assembly 104. If the foot 116 puts pressure on the RFID pressure assembly 104, an RFID tag (not separately shown in FIG. 1) of the RFID pressure assembly 104 enters an active state. In an absence of pressure, the multiple RFID pressure assemblies 104 remain in an inactive state. Examples of an RFID pressure assembly 104, as well as additional attributes of an active state and an inactive state, are described herein below with particular reference to FIGS. 4A, 4B, 5, and 7. Examples of an RFID tag are described herein below with particular reference to FIGS. 6 and 7.

The electronic device 108 includes an RFID reader 110. The RFID reader 110 is implemented as at least a portion of the electronic device 108. Examples of the electronic device 108 include a mobile phone, a smart watch, intelligent glasses, a notebook computer, an RFID reader gun, retail security scanning hardware, a medical monitoring unit, inventory tracking hardware (e.g., for manufacturing, warehouse, or retail purposes), a navigational unit, or some combination thereof.

In an example operational implementation, if the RFID reader 110 interacts with an RFID pressure assembly 104 that is in the active state, an interrogation signal 112 and a response signal 114 are exchanged. The RFID reader 110 wirelessly transmits the interrogation signal 112 to multiple RFID pressure assemblies 104, one or more of which are in the active state due to the foot 116 of the person 106 in this example scenario. An active RFID pressure assembly 104 receives the interrogation signal 112, which effectively requests that the RFID pressure assembly 104 provide information wirelessly. A request (not separately shown) of the interrogation signal 112 may specify particular information that is desired or may be asking for information generally. In response to receipt of the interrogation signal 112, an RFID tag of the RFID pressure assembly 104 formulates the response signal 114 and emanates or otherwise wirelessly sends out the response signal 114.

Hence, the RFID pressure assembly 104 provides the response signal 114 via a wireless communication that is sent over an air interface. The response signal 114 may be produced by an RFID tag of the RFID pressure assembly 104 as a version of the received interrogation signal 112. More specifically, the response signal 114 may be generated as a modulated radio frequency (RF) backscatter off of an antenna of the RFID tag of the RFID pressure assembly 104 or as a reflected encoded version of the received interrogation signal 112. Examples of an antenna and an integrated circuit (IC) of an RFID tag are described herein below with particular reference to FIG. 6. Additionally or alternatively, if an RFID tag of an RFID pressure assembly 104 is powered independently of a contemporaneous energization by an interrogation signal 112, the response signal 114 may be transmitted using transmitter circuitry of the powered RFID tag.

The RFID reader 110 wirelessly receives the response signal 114 from the RFID pressure assembly 104 that is active. The response signal 114 may include one or more pieces of information that the RFID pressure assembly 104 is storing or has obtained. Examples of information that can be included in the response signal 114 are: an identification indicator such as a code or an alphanumeric value, a descriptive indication, a number representative of a distance, a mapping or geospatial coordinate, or some combination thereof that is indicative of a position of the corresponding RFID pressure assembly 104. Alternatively, the information included in the response signal 114 may represent a command to control an appliance. Additional examples are described herein below.

Generally, RFID systems may be realized using at least low frequency (LF), high frequency (HF), or ultra-high frequency (UHF) radio waves. RFID systems may be passive or active. With active systems, RFID tags may include or otherwise have access to an independent power source, such as a battery. With passive systems, RFID tags harvest energy from an interrogation signal to become sufficiently energized so as to enable the RFID tags to reflect back a response signal. Harvested energy may also be sufficient to power an integrated circuit of an RFID tag to enable the integrated circuit to store received data or perform some amount of processing. Although not explicitly shown in the associated drawing figures, an RFID tag may include a capacitor or a small battery to temporarily collect and retain some of the energy harvested from an interrogation signal to power integrated circuit processing or the sending of a response signal.

Alternative or hybrid RFID systems may also be implemented. Examples of other RFID systems include, but are not limited to, a passive reader active tag (PRAT) system that has a passive reader which receives radio signals from active tags (e.g., battery operated transmit only tags), an active reader passive tag (ARPT) system that has an active reader which transmits interrogation signals and also receives response signals from passive tags, an active reader active tag (ARAT) system that uses active tags awoken or prompted by an interrogation signal sent from an active reader, a powered but passive tag system that has a powered passive tag (e.g., a battery-assisted passive (BAP) tag) that uses stored charge in a battery or capacitor to power continuous or repeated sensor readings and processing but awaits receipt of an interrogation signal before providing sensed values, or some combination thereof.

Figure 2:
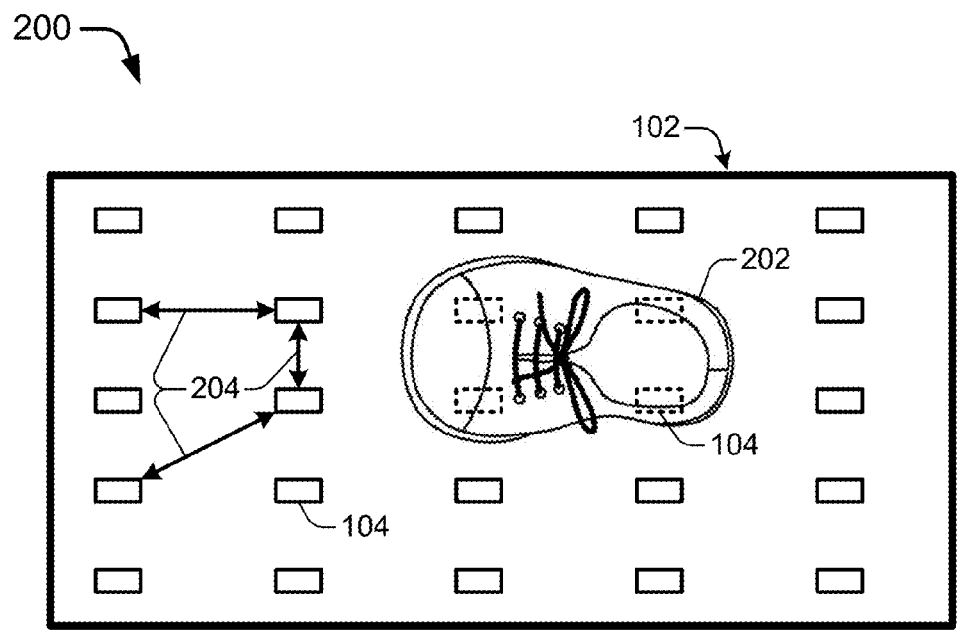
FIG. 2 illustrates a top-down view of an example surface material that includes multiple RFID pressure assemblies in accordance with one or more embodiments.

FIG. 2 illustrates a top-down view 200 of an example surface material 102 that includes multiple RFID pressure assemblies 104 in accordance with one or more embodiments. By way of example only, the surface material 102 is illustrated as a flooring surface material 102 in FIG. 2. The multiple RFID pressure assemblies 104 are shown in a fixed, regular array. Nevertheless, RFID pressure assemblies 104 may be arranged in a different pattern. A shoe 202 is used in FIG. 2 and subsequent figures to represent a foot 116 of a person 106 of FIG. 1. As shown, the shoe 202 covers or is capable of applying pressure on up to four different RFID pressure assemblies 104. As discussed below, however, a given shoe 202 may alternatively be capable of simultaneously activating fewer or more than four different RFID pressure assemblies 104.

In one or more example embodiments, RFID pressure assemblies 104 that are adjacent to one another are separated by a spacing 204. Hence, the RFID pressure assemblies 104 are manufactured or installed in a spaced-art arrangement. Even if the spacing 204 is regular as shown, the spacing 204 may differ along an East-West direction (i.e., horizontally) as compared to a North-South direction (i.e., vertically) or along different diagonal directions.

The size or length of the spacing 204 may differ across different implementations, depending on a number of different factors. Factors include, for example, acceptable cost, a substance of the surface material 102, a preference for ensuring that at least one RFID pressure assembly 104 is definitely activated at each footfall, a preference for ensuring that no more than one RFID pressure assembly 104 is activated at each footfall, or some combination thereof. If ceramic tiles cover the RFID pressure assemblies 104, for instance, then one RFID pressure assembly 104 per ceramic tile may be installed under each of the tiles. If a goal is for each footfall to provide some positioning data, for instance, then the spacing 204 may be set sufficiently small so that every step of the shoe 202 at least partially covers at least one RFID pressure assembly 104. If, on the other hand, a goal is to avoid having multiple RFID pressure assemblies 104 sending positional data simultaneously because of the risk of signal collisions, then the spacing 204 may be set sufficiently large so that no single footfall of the shoe 202 is likely to activate more than one RFID pressure assembly 104.

Figure 3:
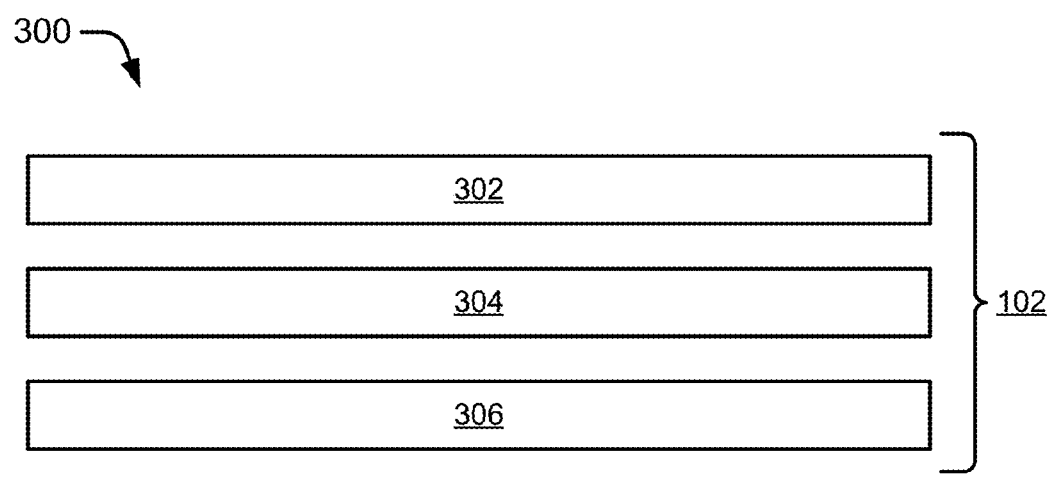
FIG. 3 illustrates a cut-away side view of an example multi-layer surface material in which embodiments of surface material enhancement with RFID tags can be implemented.

FIG. 3 illustrates a cut-away side view 300 of an example multi-layer surface material 102 in which embodiments of surface material enhancement with RFID tags can be implemented. In one or more example embodiments, a surface material 102 may be implemented with one or more layers. In the example illustrated in FIG. 3, the surface material 102 includes three layers: an outer layer 302, a middle layer 304, and an inner layer 306. However, a surface material 102 may alternatively be implemented with more or fewer layers. As used herein, the term "surface material" may refer to any one or more of the layers 302, 304, 306, etc. individually or in combination with one another. A surface material 102 is capable of being affected by pressure applied by a person. Pressure may be applied by a foot, a hand, an elbow, a hip, a tip of a cane, a wheel of a wheel chair, some combination thereof, and so forth. Examples of a surface material 102 include a flooring surface material 102 or a wall surface material 102.

For a flooring surface material 102, an inner layer 306 may be implemented as a subfloor, a middle layer 304 may be implemented as an underlayment, and an outer layer 302 may be implemented as a floor covering. Examples of a subfloor include concrete, asphalt, plywood, and dimensional lumber, such as a 2"×4" board. Examples of an underlayment include a carpet pad such as foam padding, a sheet of plastic such as a vapor or moisture barrier, asphalt felt paper or builder's felt, and a backer board such as a cement board. Examples of a floor covering include carpet such as a commercial style or a pile carpeting style, ceramic tile, porcelain or slate tile, vinyl sheets or tiles, linoleum, hardwood flooring, engineered wood flooring, laminate flooring, artificial grass or turf, bricks or pavers, stones, and composite tile or decking.

Although many of the example flooring types provided above pertain primarily to indoor flooring, it should be understood that the various embodiments as described herein may alternatively be implemented outdoors. Furthermore, embodiments of flooring surface material enhancement with RFID tags may be implemented with any surface on which a person walks. Examples include exercise or training surfaces such as indoor or outdoor tracks. Examples of a flooring surface material further include at least parts of exercise equipment such as an exercise treadmill, a stair stepper, or an elliptical machine. With a treadmill, RFID pressure assemblies can be embedded in a rotating belt that absorbs the footfalls of a walker or runner. Response signals sent by the embedded RFID pressure assemblies responsive to foot pressure and an interrogation signal can be used by a treadmill or an electronic device 108 (of FIG. 1) to calculate a person's gait, to accurately count the person's footsteps, to analyze the person's form, and so forth.

For a wall surface material 102, an inner layer 306 may be implemented as sheetrock or plywood, a middle layer 304 may be implemented as an adhesive layer or a priming foundation or a sheeting of paper or plastic, and an outer layer 302 may be implemented as wallpaper or paint. A given layer may be coextensive with other layers or may be smaller than other layers. A layer may be formed from a solid or perforated sheet of some substance or from patches of some substance. The RFID pressure assemblies 104 may be placed at regular or frequent intervals, such as along a line at elbow height, or may be placed at irregular or infrequent locations, such as near doorways. The outer layer 302 may include some indication, such as paint or a decal or a pattern, of a presence of an RFID pressure assembly 104 if the RFID pressure assembly is not visible or otherwise apparent.

Additionally, it should be understood that RFID pressure assemblies 104 may be implemented in one layer of the surface material 102, across two or more layers of the surface material 102, at least partially between two or more layers of the surface material 102, some combination thereof, and so forth. By way of example only, RFID pressure assemblies 104 may be installed as part of an outer layer 302 or as part of a middle layer 304. RFID pressure assemblies 104 may be utilized with a top or sole layer of a surface material 102 without being covered by another layer. Specific examples in which RFID pressure assemblies 104 are implemented primarily as part of a middle layer 304 are described herein below with particular reference to FIGS. 4A and 7. Specific examples in which RFID pressure assemblies 104 are implemented primarily as part of an outer layer 302 are described herein below with particular reference to FIG. 4B. And specific examples in which RFID pressure assemblies 104 are implemented primarily as part of or between an outer layer 302 and a middle layer 304 are described herein below with particular reference to FIG. 5.

Figure 4A:
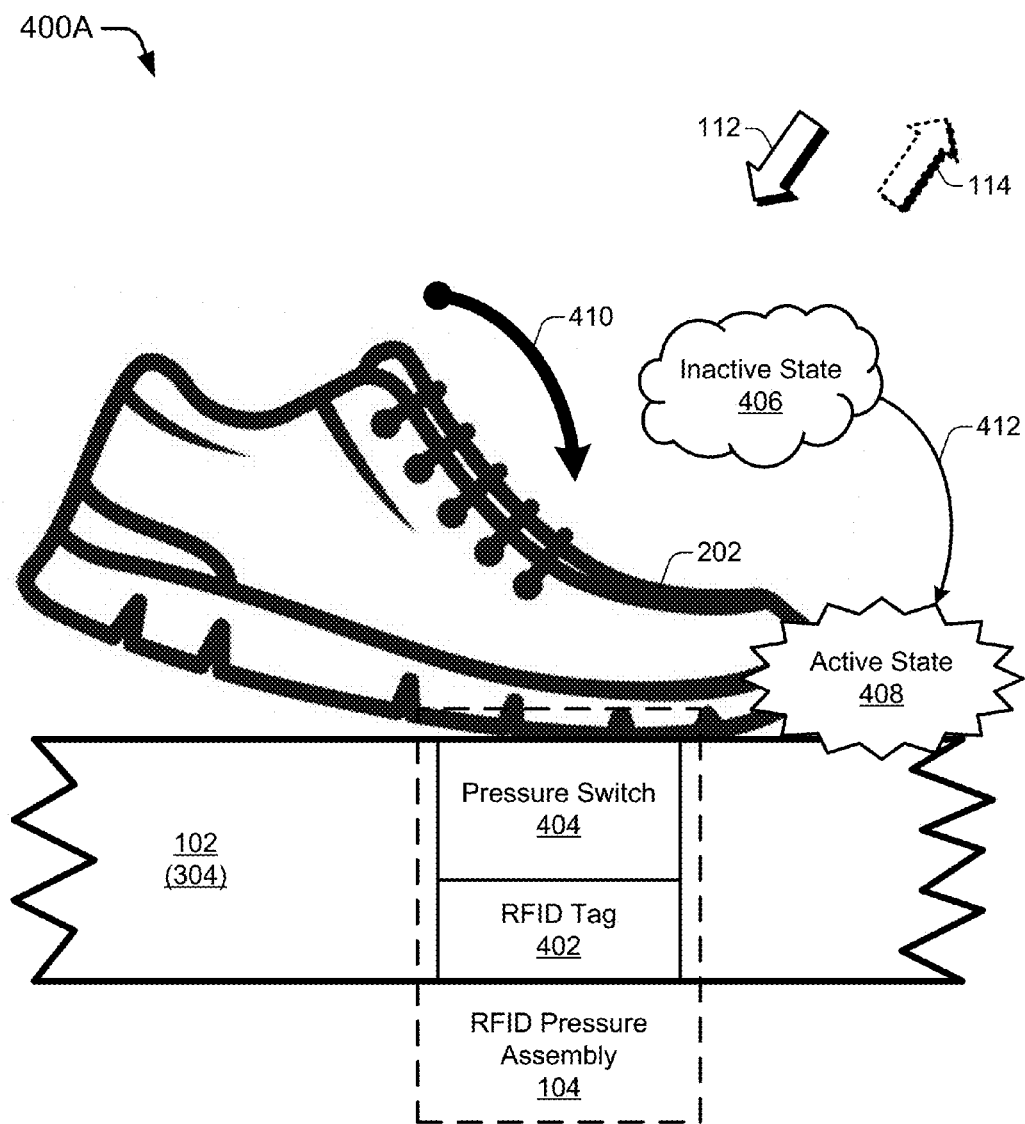
FIG. 4A illustrates a cut-away side view of a flooring surface material that depicts a schematic diagram of an example RFID pressure assembly in accordance with one or more embodiments.

FIG. 4A illustrates a cut-away side view 400A of a flooring surface material 102 that depicts a schematic diagram of an example RFID pressure assembly 104 in accordance with one or more embodiments. As shown for this example, the RFID pressure assembly 104 is at least partially installed as part of the middle layer 304 (also of FIG. 3) of a flooring surface material 102. Other layer(s), such as an outer layer 302, are omitted for the sake of visual clarity. A shoe 202 is illustrated as stepping on the RFID pressure assembly 104.

In one or more example embodiments, the RFID pressure assembly 104 includes an RFID tag 402 and a pressure switch 404. The RFID tag 402 has an inactive state 406 and an active state 408. In the active state 408, the RFID tag 402 responds to an interrogation signal 112. The RFID tag 402 may respond to the interrogation signal 112 by, for instance, sending back a response signal 114. In the inactive state 406, the RFID tag 402 fails to respond to an interrogation signal 112. The RFID tag 402 may fail to respond to the interrogation signal 112 by, for instance, being unable to receive the interrogation signal 112, being unable to send a response signal, refraining from sending a response signal, being unable to process the interrogation signal 112, omitting the processing of the interrogation signal 112, some combination thereof, and so forth.

The pressure switch 404 is coupled to the RFID tag 402 and implemented so as to respond to foot pressure generated as a person walks over the middle layer 304 of the flooring surface material 102 in which the RFID pressure assembly 104 is installed. The pressure switch 404 maintains the RFID tag 402 in the inactive state 406 in an absence of foot pressure and switches the RFID tag 402 into the active state 408 in response to being subjected to foot pressure, such as through the shoe 202. For example, as or after the shoe 202 makes a footfall 410 on the pressure switch 404 and actuates the pressure switch 404, the pressure switch 404 causes the RFID tag 402 to switch 412 from the inactive state 406 to the active state 408.

The pressure switch 404 may place the RFID tag 402 in the active state 408 by causing a circuit to be completed of the RFID pressure assembly 104 generally or of the RFID tag 402 specifically. A circuit may be completed by adding a conductive element to enable functionality of the circuit, by removing—such as pushing or depressing—an insulator so that two existing conductive elements are made to contact each other to enable functionality of the circuit, by removing—such as pushing or depressing—a conductive element that is otherwise creating a short (e.g., to ground) to thereby enable functionality of the circuit, some combination thereof, and so forth. A circuit-level diagram that includes an example of a circuit of an RFID pressure assembly 104 that is completed responsive to pressure on a pressure switch 404 is described herein below with particular reference to FIG. 7. Functionality of a circuit may be enabled by permitting an antenna to be modulated by a received interrogation signal, by permitting an RFID tag to be energized by a received interrogation signal, by setting an operability input of an integrated circuit of the RFID tag into an operational mode, by signaling authorization to process or respond to an interrogation signal, some combination thereof, and so forth. An operability input of an integrated circuit may be implemented as, for example, a reset input, a chip enable input, a standby input, or some combination thereof.

Figure 4B:
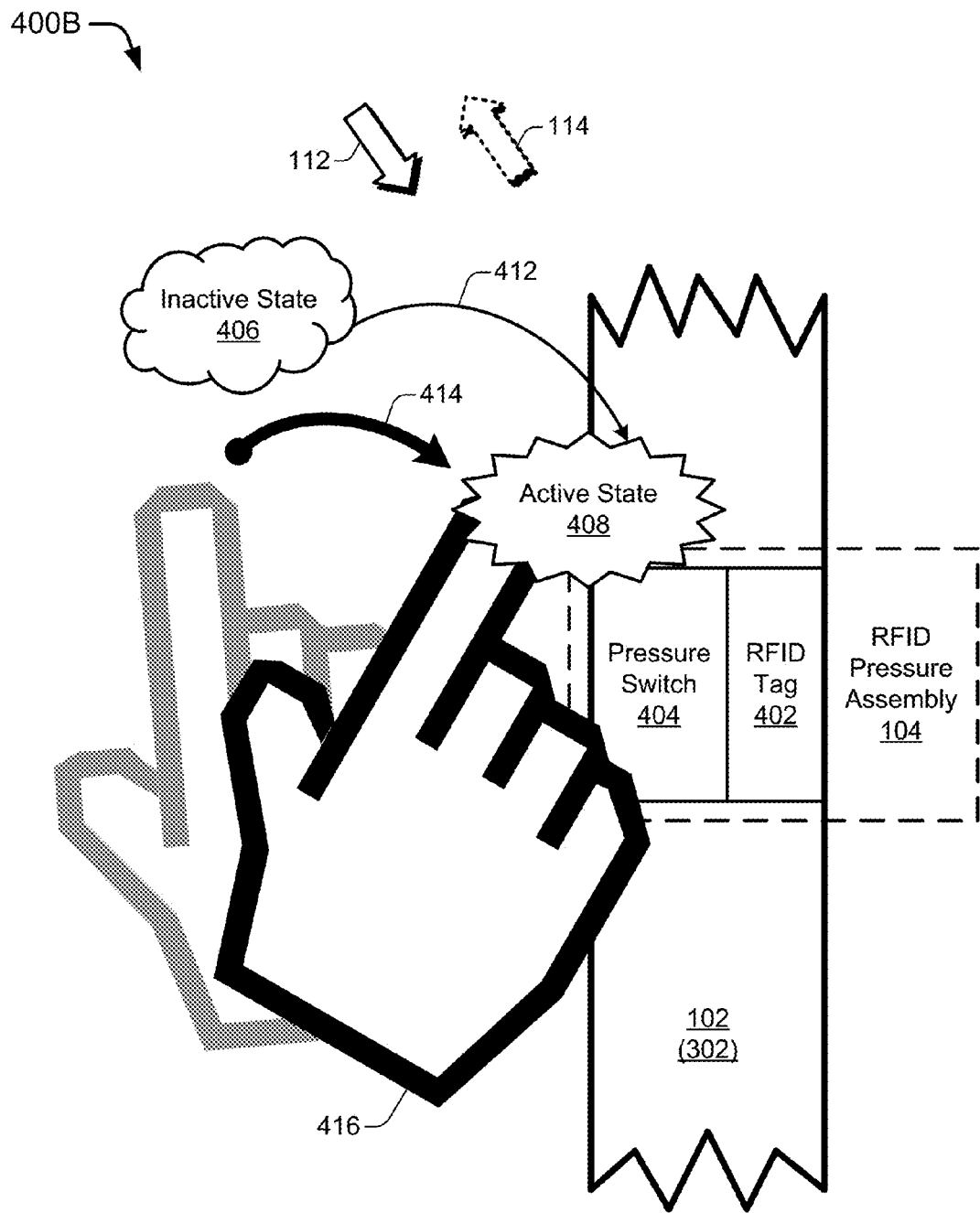
FIG. 4B illustrates a cut-away side view of a wall surface material that depicts a schematic diagram of an example RFID pressure assembly in accordance with one or more embodiments.

FIG. 4B illustrates a cut-away side view 400B of a wall surface material 102 that depicts a schematic diagram of an example RFID pressure assembly 104 in accordance with one or more embodiments. As shown for this example, the RFID pressure assembly 104 is at least partially installed as part of the outer layer 302 (also of FIG. 3) of a wall surface material 102. Other layer(s), such as a middle layer 304 or an inner layer 306, are omitted for the sake of visual clarity. A hand 416 is illustrated as pushing on the RFID pressure assembly 104.

In one or more example embodiments, the pressure switch 404 is coupled to the RFID tag 402 and implemented so as to respond to hand pressure generated as a person pushes against the outer layer 302 of the wall surface material 102 in which the RFID pressure assembly 104 is installed. The pressure switch 404 maintains the RFID tag 402 in the inactive state 406 in an absence of hand pressure and switches the RFID tag 402 into the active state 408 in response to being subjected to hand pressure by the hand 416. For example, as or after the hand 416 makes a finger tap 414 on the pressure switch 404 and actuates the pressure switch 404, the pressure switch 404 causes the RFID tag 402 to switch 412 from the inactive state 406 to the active state 408. If the RFID tag 402 is in the active state 408, the RFID tag 402 responds to an interrogation signal 112, e.g., with a response signal 114.

Figure 5:
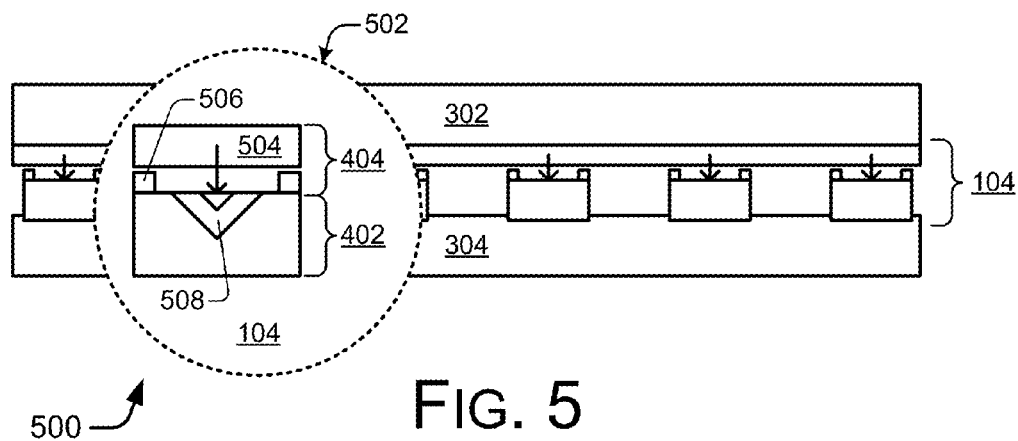
FIG. 5 illustrates a cut-away side view of a surface material including an outer layer and a middle layer that depicts another example RFID pressure assembly in accordance with one or more embodiments.

FIG. 5 illustrates a cut-away side view 500 that includes an outer layer 302 and a middle layer 304 of a surface material that depicts another example implementation of an RFID pressure assembly 104 in accordance with one or more embodiments. As shown for this example, multiple RFID pressure assemblies 104 are at least partially installed so as to be "sandwiched" between the outer layer 302 and the middle layer 304. An enlarged view of an RFID pressure assembly 104 is shown in a magnification circle 502.

With reference to the magnification circle 502, an RFID tag 402 is integrated with, embedded in, adhered to, or secured proximate to a topside of the middle layer 304. The RFID tag 402 includes at least one contact point 508, which may be implemented as a conductive element. A conductive layer 504 is integrated with, embedded in, adhered to, or secured proximate to a bottom side of the outer layer 302. A pressure switch 404 includes the conductive layer 504 and spacing guards 506. A resiliency of the conductive layer 504, along with a height of the spacing guards 506, biases the conductive layer 504 away from the contact point 508. In an example operation, pressure may be applied to the pressure switch 404 by a foot or a hand of a person. As indicated by the downward pointing arrow in the magnification circle 502, the applied pressure causes the conductive layer 504 to flex between the spacing guards 506 and make contact with the contact point 508. The electrical coupling between the conductive layer 504 and the contact point 508 completes a circuit of the RFID pressure assembly 104 to place the RFID tag 402 in the active state.

Figure 6:
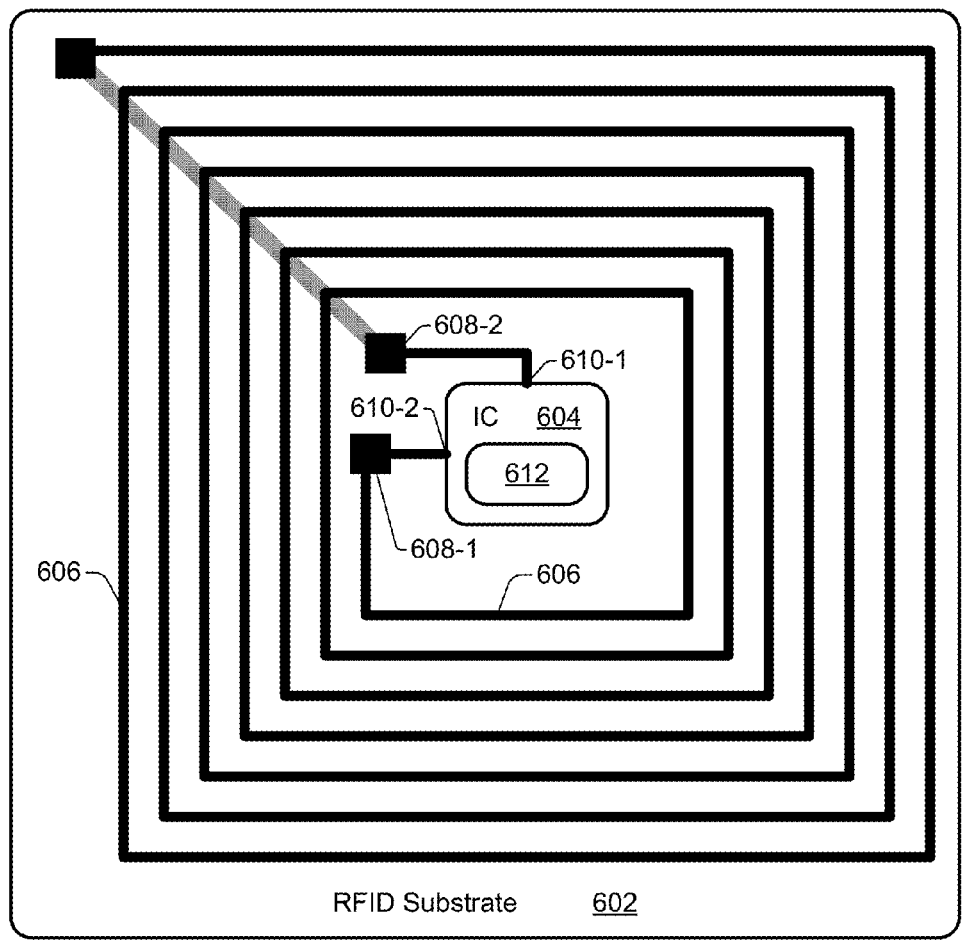
FIG. 6 illustrates an example RFID tag with which embodiments of surface material enhancement with RFID tags can be implemented.

FIG. 6 illustrates a schematic diagram of an example RFID tag 402 with which embodiments of surface material enhancement with RFID tags can be implemented. For example embodiments, the RFID tag 402 may include an RFID substrate 602. Examples of substances for the RFID substrate 602 are paper, plastic (e.g., flexible or rigid), wood, glass, ceramic, printed circuit board (PCB), a flooring material, a wall material, or some combination thereof. The RFID substrate 602 may form a backbone or a foundation or a framework of a supporting structure for the RFID tag 402. Alternatively, the RFID substrate 602 may be attached to, encapsulated within, incorporated as part of, etc. a backbone or a foundation or a framework of a supporting structure for the RFID tag 402, such as a flooring material or a wall material of a surface material.

As illustrated in the example schematic diagram of FIG. 6, the RFID substrate 602 includes or at least supports an IC 604 and an antenna 606. The IC 604 includes two antenna terminals 610: a first antenna terminal 610-1 and a second antenna terminal 610-2. The antenna 606 includes two antenna ends 608: a first antenna end 608-1 and a second antenna end 608-2. Note that the part of the antenna 606 that is located at the top left corner of the RFID substrate 602 may alternatively or additionally be considered a second antenna end 608-2 (which additional reference number is not illustrated). One of the first antenna end 608-1 or the second antenna end 608-2 may be considered a so-called antenna loop in, and the other may be considered a so-called antenna loop out. The first antenna terminal 610-1 of the IC 604 is coupled to the second antenna end 608-2 of the antenna 606, and the second antenna terminal 610-2 of the IC 604 is coupled to the first antenna end 608-1 of the antenna 606. The antenna 606 enables the IC 604 to receive or send wireless signals for the RFID tag 402.

The IC 604 may be implemented using any of one or more processors (e.g., a microprocessor, a controller, a computing core, or a combination thereof) or processing systems with storage memory having processor-executable instructions that are fixed, hardware-encoded, programmable, alterable, wirelessly-receivable, or a combination thereof. The IC 604 may be realized, by way of example but not limitation, as an application-specific integrated circuit (ASIC), a field-programmable gate array (FPGA), a complex programmable logic device (CPLD), an application-specific standard product (ASSP), a system on-a-chip (SoC), a silicon-based processing unit, or some combination thereof. Generally, an integrated circuit can be realized with hardware along with one or more of software, firmware, or fixed logic circuitry that is implemented in connection with processing or control circuits.

The RFID tag 402 may further include processor-accessible storage memory 612. The storage memory 612 can be integrated with the IC 604 (as shown) or separate from the IC 604. The storage memory 612 enables persistent storage of data or processor-executable instructions (e.g., software applications, programs, functions, hard-coded operations, or a combination thereof). The storage memory 612 can include various implementations of random access memory (RAM), read only memory (ROM), flash memory, or other types of storage media in various memory device configurations. Although not specifically indicated in FIG. 6, the RFID tag 402 may further include an interconnect (e.g., a bus or other data transfer mechanism with traces, wires, buffers, etc.) that couples components of the RFID tag 402 to each other. Although not depicted in FIG. 6, the RFID tag 402 may also include a power source, such as a non-rechargeable battery, a battery that is rechargeable by wire or wirelessly, a capacitor, a combination thereof, and so forth.

RFID tags may be produced in many different shapes, sizes, form factors, and materials. For example, RFID tags may be flat (i.e., two-dimensional) or three-dimensional (e.g., having an appreciable depth in addition to height and width). RFID tags may be square, rectangular, circular, triangular, box-shaped, spherical, cylindrical, and forth. Furthermore, RFID tags may be, for instance, at least as small as a grain of rice or at least as big as several inches across. An RFID substrate of an RFID tag may be secured to another object, such as being interwoven with an underside of a roll of carpet or an interior of a roll of wallpaper; may be incorporated into another object, such as a foam carpet pad or an adhesive sheet; may be adhered to another object, such as a subfloor or sheetrock; and so forth. Additionally, an RFID tag may be enclosed within or encapsulated by another substance or object, may be hidden by one or more layers of a surface material, may be exposed or visible, some combination thereof, and so forth.

Figure 7:
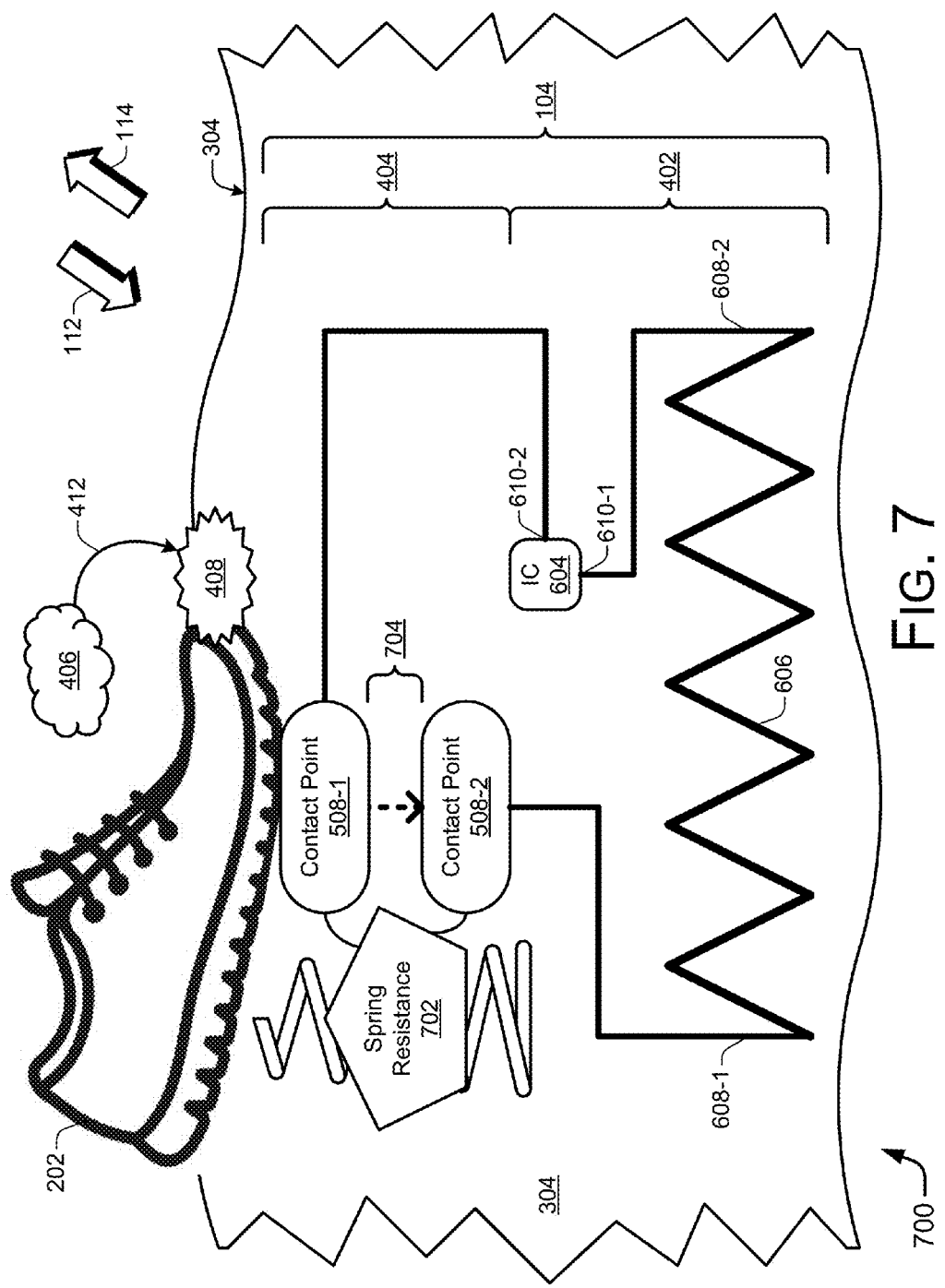
FIG. 7 illustrates a middle layer and depicts a circuit diagram of an example RFID pressure assembly in accordance with one or more embodiments.

FIG. 7 illustrates at 700 generally a middle layer 304 and depicts a circuit diagram of an example RFID pressure assembly 104 in accordance with one or more embodiments. A shoe 202 is depicted in a position to activate the RFID pressure assembly 104 that is incorporated into the middle layer 304 of a surface material, which is illustrated as a flooring surface material in FIG. 7 by way of example only. The RFID pressure assembly 104 includes at least two portions: an RFID tag 402 and a pressure switch 404.

In one or more example embodiments, the RFID tag 402 includes an integrated circuit 604 and an antenna 606. The pressure switch 404 includes a spring resistance 702 and at least one contact point 508. Specifically, the contact point 508 is implemented as a first contact point 508-1 and a second contact point 508-2 in this example. Each contact point 508 may be implemented as, for instance, a dot, a line, a pad, an area corresponding to some two-dimensional geometric shape, a wire, a conductive trace, a pattern formed of a conductive material, or some combination thereof. Although the first and second contact points 508-1 and 508-2 are described with regard to FIG. 7 as being part of the pressure switch 404, this is for the purposes of explanation only. One or both of the first and second contact points 508-1 and 508-2 may alternatively be implemented as part of the RFID tag 402.

In the example illustrated circuit diagram for the RFID pressure assembly 104, the antenna 606 includes a first antenna end 608-1 and a second antenna end 608-2, and the integrated circuit 604 includes a first antenna terminal 610-1 and a second antenna terminal 610-2. The second antenna end 608-2 is coupled to the first antenna terminal 610-1 of the integrated circuit 604, and the second antenna terminal 610-2 of the integrated circuit 604 is coupled to the first contact point 508-1. A collapsible gap 704 is present between the first contact point 508-1 and the second contact point 508-2. The second contact point 508-2 is coupled to the first antenna end 608-1 of the antenna 606. If the first contact point 508-1 is touching the second contact point 508-2, a circuit is completed. If the circuit is completed, the integrated circuit 604 and the antenna 606 are capable of receiving and processing an interrogation signal 112 such that a response signal 114 may be reflected outwards. If the first contact point 508-1 is not touching the second contact point 508-2, the integrated circuit 604 or the antenna 606 are rendered incapable of receiving or of processing an interrogation signal 112 or of sending out a response signal 114.

The spring resistance 702 of the pressure switch 404 produces a bias force to maintain the collapsible gap 704 and to keep the first contact point 508-1 apart from the second contact point 508-2 to prevent the circuit of the RFID pressure assembly 104 from being completed for the inactive state 406 of the RFID tag 402. If the shoe 202 applies foot pressure and if the foot pressure is sufficient to overcome the bias force of the spring resistance 702, the pressure switch 404 is actuated and the collapsible gap 704 is collapsed. Due to the collapse of the collapsible gap 704, the first contact point 508-1 is pressed into contact with the second contact point 508-2 to thereby complete the circuit of the RFID pressure assembly 104 for the active state 408 of the RFID tag 402. In the active state 408 and in response to receiving the interrogation signal 112, the RFID tag 402 sends out the response signal 114, which may include at least one positional indicator or at least one appliance control command. Example embodiments pertaining to a positional indicator or an appliance control command are described further herein below with particular reference to FIG. 8.

The spring resistance 702 or at least one contact point 508 of the pressure switch 404 may be implemented at least partially as a mechanical spring—such as one made from a lever or a coil (as shown), a scissor switch, a bubble switch—such as one made from polyurethane, a dome switch—such as one made from metal or rubber, a flat or low-profile micro switch, a metal strip, a conductive area, some combination thereof, and so forth. With a dome switch, for instance, one circular metal contact at the top of the dome may be pressed down to couple together to curvilinear contacts at the base of the dome. Other types of switches or mechanisms to create a spring resistance 702 may alternatively be implemented.

Figure 8:
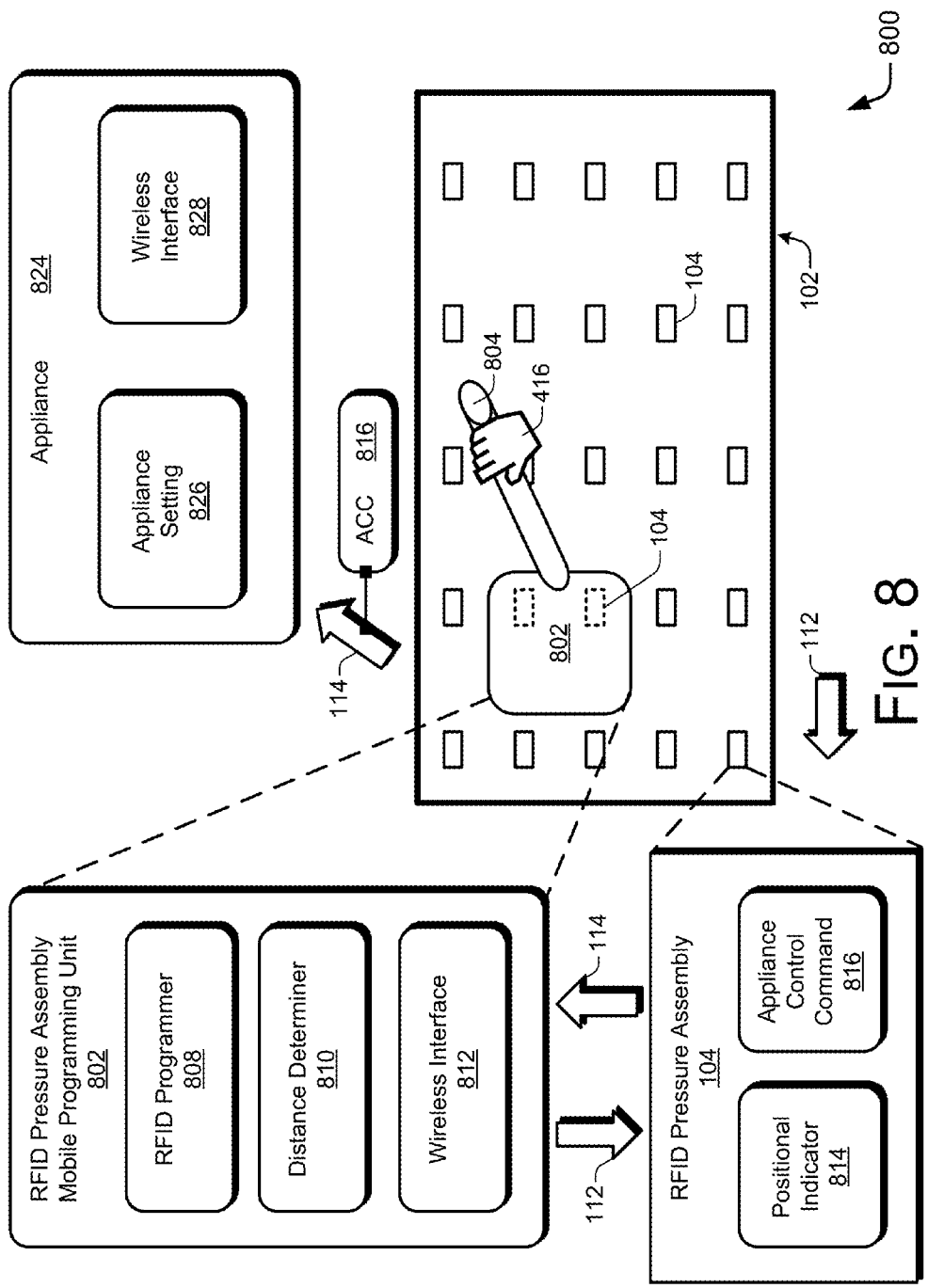
FIG. 8 illustrates example techniques for programming an RFID pressure assembly and example schemes for using an RFID pressure assembly to control an appliance.

FIG. 8 illustrates, at 800 generally, example techniques for programming an RFID pressure assembly 104 and example schemes for using an RFID pressure assembly 104 to control an appliance 824. The surface material 102, which is illustrated as a flooring surface material 102 in FIG. 8 by way of example only, includes multiple RFID pressure assemblies 104, which are visible for purposes of explanation but may instead be hidden under one or more layers. In one or more example embodiments, an RFID pressure assembly 104 includes at least one positional indicator 814, at least one appliance control command 816, or other information. The positional indicator 814 or the appliance control command 816 may be stored in a storage memory 612 of an integrated circuit 604 (both of FIG. 6) of an RFID tag. Although not shown, the RFID pressure assembly 104 may also store a unique identifier, such as a set of alphanumeric characters, corresponding to the RFID pressure assembly 104 or an RFID tag thereof.

For embodiments involving positioning information, the positional indicator 814 is provided by the RFID pressure assembly 104 in response to receiving an interrogation signal 112 if an RFID tag 402 (of FIGS. 4A-7) of the RFID pressure assembly 104 is in the active state. Examples of the positional indicator 814 include at least one location identifier, at least one distance indication, or some combination thereof. A location identifier may include, for instance, a room number in an office building or hotel, a store name in a mall, a room description such as "first floor powder bath" or "threshold between kitchen and family room" in a domicile, one or more coordinates (e.g., GPS coordinates or local building map coordinates), or some combination thereof. A distance indication may include, for instance, a distance to a building structural feature, such as a vertical building structural feature like a wall or a door (e.g., 10 feet to front door), a spatial building structural feature like a room or an area, a known geospatial or building mapping coordinate. The positional indicator 814 may further include a directional indication, including separately or as part of a distance indication. Additionally or alternatively, a positional indicator 814 or other data stored by an RFID tag may include descriptive details of a building, such as stairs, door, elevator, or specific rooms (e.g., kitchen, office, or bathroom), including a distance or a direction thereto.

In order to provide a positional indicator 814, each of the RFID pressure assemblies 104 is first programmed with an appropriate positional indicator 814. In an example programming implementation, a person 106 (of FIG. 1) may walk around the surface material 102 with an electronic device 108 having an RFID reader 110 that is configured to determine a current positional indicator, e.g. using sensors—such as an inertial measurement unit (IMU) or a GPS chip—or user input, and to include the determined positional indicator in an initial or a subsequent interrogation signal 112. Additionally or alternatively, a specialized apparatus can be used to program the RFID pressure assemblies 104.

In an example programming implementation with a specialized apparatus, an RFID pressure assembly mobile programming unit 802 may be utilized to program multiple RFID pressure assemblies 104. In a manual programming implementation, a person as represented by a hand 416 may grasp a handle 804 and push the RFID pressure assembly mobile programming unit 802 around and over the surface material 102, including up and over a wall in a wall surface material embodiment. Alternatively, the RFID pressure assembly mobile programming unit 802 may be self-propelled to ease manual usage by a person. Furthermore, the RFID pressure assembly mobile programming unit 802 may be at least partially automated such that movement or RFID programming is controlled by motors or logic of the RFID pressure assembly mobile programming unit 802. An automated implementation of the RFID pressure assembly mobile programming unit 802 may also be robotized in a manner analogous to robot vacuum cleaners, for instance.

In one or more example embodiments, the RFID pressure assembly mobile programming unit 802 includes an RFID programmer 808, a distance determiner 810, and a wireless interface 812. The wireless interface 812 enables the RFID pressure assembly mobile programming unit 802 to communicate wirelessly with an RFID tag 402, with an electronic device 108 (of FIG. 1), with an appliance 824, with a Wi-Fi access point (not shown), and so forth. The RFID programmer 808 implements logic to transmit, via the wireless interface 812, the positional indicator 814 to an RFID pressure assembly 104 in a manner that causes the RFID tag 402 of the RFID pressure assembly 104 to store the positional indicator 814 for subsequent inclusion in a response signal 114. The RFID programmer 808 may, for instance, include at least one code in the interrogation signal 112 that defines the meaning of the positional indicator 814 or that instructs the RFID tag to store the positional indicator

814. In an example implementation, the RFID programmer 808 or the wireless interface 812 may individually or jointly be realized as a type of RFID reader. The RFID pressure assembly mobile programming unit 802 may also be capable of individually determining or otherwise obtaining at least one location reference, such as one or more geospatial or mapping coordinates, using a GPS chip, a wireless interface to a mobile or Wi-Fi network, a short-range link to an electronic device 108 (e.g., of FIG. 1), manual input, some combination thereof, and so forth.

The distance determiner 810 determines a distance between the RFID pressure assembly mobile programming unit 802, whose current location may act as a surrogate for a location of an RFID pressure assembly 104 being programmed, and a vertical structural feature of a building, such as a wall or a door, or a known geospatial or mapping coordinate. The distance may be measured using a wireless signal (e.g., radio frequency (RF), infrared (IR), or sound signal) that is transmitted from the distance determiner 810, reflected off of the vertical structural feature, and returned to the RFID pressure assembly mobile programming unit 802. Alternatively, the distance may be determined based on a length of flooring traveled by the RFID pressure assembly mobile programming unit 802 as measured, for instance, by a number of rotations of a wheel of the RFID pressure assembly mobile programming unit 802 between the vertical structural feature and the RFID pressure assembly 104 being programmed. As yet another alternative, the RFID pressure assembly mobile programming unit 802 may determine a distance by calculating the distance between two geospatial or mapping coordinates. Hence, the distance determiner 810 may further determine a distance for the positional indicator 814 using one or more other techniques, such as by using a satellite positioning system or trilateration with multiple Wi-Fi access points to ascertain one or more geospatial or mapping coordinates. Distance determinations may also be made using one or more values produced by an inertial measurement unit (IMU).

The RFID pressure assembly mobile programming unit 802 may be adjusted to program a single RFID pressure assembly 104 at any given moment or multiple RFID pressure assemblies 104 in groups. To adjust a number of RFID pressure assemblies 104 that are being programmed at any given moment, the physical dimensions of the RFID pressure assembly mobile programming unit 802, a focus or beamforming capability of a transmission of an interrogation signal 112 that is being used for programming, a size of an area of physical contact against the surface material 102, a combination thereof, etc. may be designed, tailored, or adjusted accordingly. For example, a coverage area of one or more wheels of the RFID pressure assembly mobile programming unit 802 that are causing sufficient pressure to activate an RFID tag may be adjusted such that one RFID pressure assembly 104 is triggered at any given moment so as to differentiate each RFID pressure assembly 104 with an individualized positional indicator 814 and therefore increase a level of positioning precision between any two RFID pressure assemblies 104.

For embodiments involving appliance control, the appliance control command 816 is provided by the RFID pressure assembly 104 in response to receiving an interrogation signal 112 if an RFID tag 402 (of FIGS. 4A-7) of the RFID pressure assembly 104 is in an active state. In a regular, non-programming mode of operation, a person walks across the surface material 102, and the interrogation signal 112 is transmitted by, for example, an electronic device 108 (of FIG. 1) or by an appliance 824. Examples of the appliance 824 include a thermostat, a television, an oven, a security device, a light bulb, a light fixture or kit, a sound source, and an electrical outlet. The appliance 824 includes a wireless interface 828 and at least one appliance setting 826. The wireless interface 828 enables the appliance 824 to wirelessly communicate with an electronic device 108, an RFID pressure assembly mobile programming unit 802, a remote website or cloud service via a Wi-Fi access point (not shown), an RFID pressure assembly 104 using an interrogation signal 112 or a response signal 114, and so forth.

The appliance setting 826 effectively establishes a state of operation for the appliance 824. Changing the appliance setting 826 changes the state of the corresponding appliance 824. The appliance setting 826 may vary by appliance. A thermostat, for instance, may have an on/off or a temperature setting. A sound source may have a volume level, a speaker designation, a streaming account, or a playlist setting. A light bulb may have an on/off, a color, or a luminosity setting. The appliance 824 is capable of receiving an appliance control command 816 wirelessly via the wireless interface 828. The appliance 824 processes the received appliance control command 816, interprets the appliance control command 816 as an instruction to change the appliance setting 826, and establishes the corresponding appliance setting 826 to achieve the desired or requested appliance state.

In order to provide an appliance control command 816, each of the RFID pressure assemblies 104 is first programmed with an appropriate appliance control command 816. In an example programming implementation, a person 106 (of FIG. 1) may walk around the surface material 102 (i) with an electronic device 108 having an RFID reader 110 that is configured to transmit a desired appliance control command 816 as part of an initial or a subsequent interrogation signal 112 or (ii) while the appliance 824 is in an RFID-programming mode in which the desired appliance control command 816 is being repeatedly transmitted as part of an initial or subsequent interrogation signal 112 by the appliance 824. The desired appliance control command 816 may be determined by communicating with the targeted appliance 824, using an app for the targeted appliance 824, contacting a website of the manufacturer of the targeted appliance 824, some combination thereof, and forth. Alternatively, for wall surface material embodiments, a person may walk along next to a surface material 102 while pressing against RFID pressure assemblies 104 that are to be programmed.

Additionally or alternatively, a specialized apparatus, such as the RFID pressure assembly mobile programming unit 802, can be used to program the RFID pressure assemblies 104 in manners analogous to those described above with regard to programming a positional indicator 814. For the appliance control command 816, the RFID programmer 808 may be provided an appropriate appliance control command 816 by putting the appliance 824 in an RFID-programming mode so that the appliance 824 transmits the command to the RFID pressure assembly mobile programming unit 802, by using an app executing on the electronic device 108 (of FIG. 1) for the RFID pressure assembly mobile programming unit 802, by connecting the RFID pressure assembly mobile programming unit 802 to a remote cloud service via a Wi-Fi access point using the wireless interface 812, by manually inputting an appliance control command 816, some combination thereof, and so forth.

Figure 9:
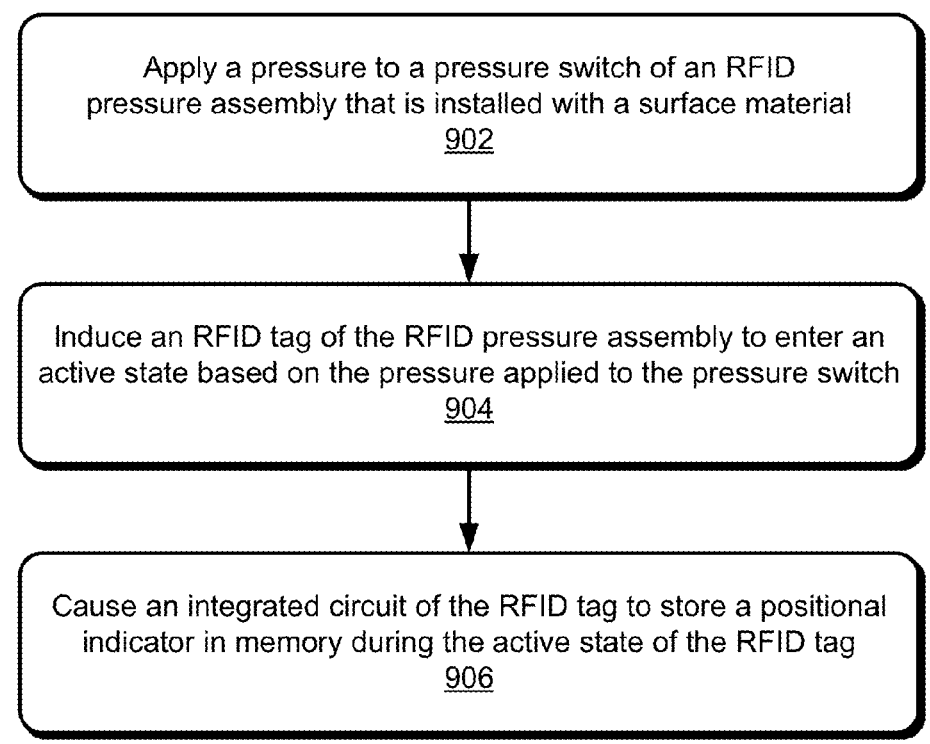
FIG. 9 illustrates an example method for programming an RFID pressure assembly in accordance with one or more embodiments.
Figure 10:
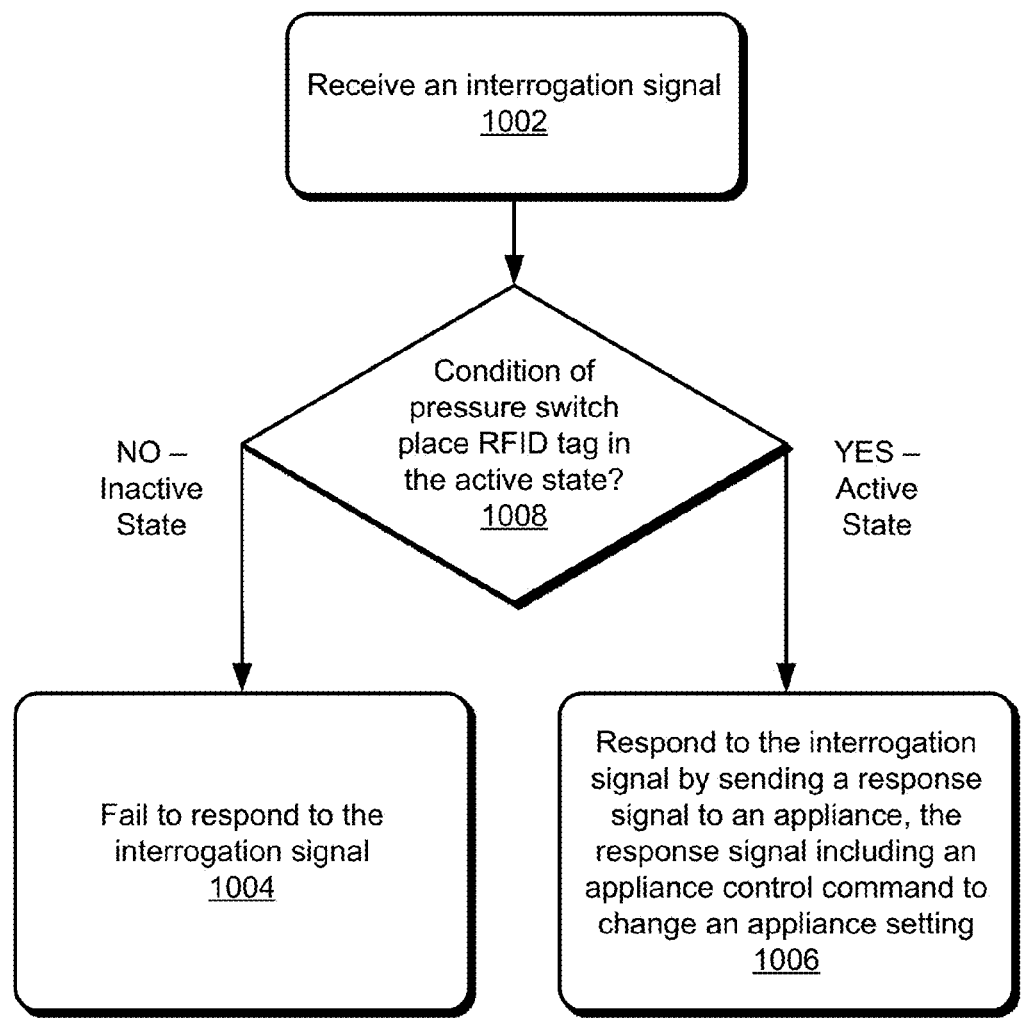
FIG. 10 illustrates an example method for using an RFID pressure assembly to control an appliance in accordance with one or more embodiments.

FIGS. 9 and 10 illustrate example methods relating to surface material enhancement with RFID tags in accordance with one or more embodiments. The order in which the methods are shown in the FIGS. or described herein is not intended to be construed as a limitation, and any number or combination of the described method operations can be performed in any order or with any amount of overlap to perform a method, or an alternate method.

FIG. 9 illustrates an example method for programming an RFID pressure assembly 104 in accordance with one or more embodiments. For flow diagram 900, operations 902-906 may be performed by a person or by an apparatus, such as an RFID pressure assembly mobile programming unit 802. At block 902, a pressure is applied to a pressure switch of an RFID pressure assembly that is installed with a surface material. For example, pressure may be applied to a pressure switch 404 of an RFID pressure assembly 104 that is installed with (e.g., integrated with, incorporated into, secured to, formed as part of, or some combination thereof) a flooring or wall surface material. For instance, a foot 116 of a person 106 may step on or a wheel of an RFID pressure assembly mobile programming unit 802 may roll over a switch that is actuated by weight of an object.

At block 904, an RFID tag of the RFID pressure assembly is induced to enter an active state based on the pressure applied to the pressure switch. For example, an RFID tag 402 of the RFID pressure assembly 104 may be induced (e.g., triggered, precipitated, or caused) to enter an active state 408 based on the pressure applied to the pressure switch 404. A circuit of the RFID pressure assembly 104, for instance, may be completed by a switch being closed so as to render the RFID tag 402 capable of processing or responding to a received interrogation signal 112.

At block 906, an integrated circuit of the RFID tag is caused to store a positional indicator in memory during the active state of the RFID tag. For example, an integrated circuit 604 of the RFID tag 402 may be caused to store a positional indicator 814 in storage memory 612 during the active state 408 of the RFID tag 402. For instance, a code, which is indicative that a positional indicator 814 is being provided contemporaneously or separately, may be included in an interrogation signal 112 that is transmitted to the RFID tag 402 from an electronic device 108 carried by the person 106 or from the RFID pressure assembly mobile programming unit 802. The code may serve as an instruction to the integrated circuit 604 of the RFID tag 402 to store the positional indicator 814 in the storage memory 612.

Methods or operations described herein, such as those of FIG. 10, can be implemented using hardware in conjunction with software, firmware, fixed logic circuitry, a combination thereof, and so forth. Some operations of the example methods may be described in a general context of processor-executable instructions that are stored on processor-accessible (e.g., computer-readable) storage memory that is part of an RFID tag 402 (e.g., that is disposed on an RFID substrate 602 as part of, or separate from, an IC 604).

FIG. 10 illustrates an example method for using an RFID pressure assembly 104 to control an appliance 824 in accordance with one or more embodiments. For flow diagram 1000, operations 1002-1008 may be performed by an RFID tag 402 in conjunction with a pressure switch 404. The pressure switch 404 completes a circuit if a person applies pressure to (e.g., presses on, steps on with a foot, pushes with a hand, nudges with an elbow, taps with a finger, or some combination thereof) the pressure switch. The circuit may be completed by rendering the circuit operable to perform a given task, for instance, by removing or instituting a short-circuit condition, removing or instituting an open-circuit condition, or a combination thereof using at least one switching component. The RFID tag 402 is coupled to the pressure switch and switches from an inactive state 406 to an active state 408 if the circuit is completed by the pressure switch 404.

At block 1002, an interrogation signal is received. For example, RF electromagnetic radiation that is carrying an interrogation signal 112 may be incident on an antenna 606 of the RFID tag 402. The interrogation signal 112 may be a general wake-up or power-providing signal for the RFID tag 402 or may include a specific instruction pertaining to appliance control. The interrogation signal 112 may include, for instance, a specific instruction to send out a response signal 114 that includes a command to change an appliance setting 826. The RFID tag 402 may be in the inactive state 406 or the active state 408 depending on if the pressure switch 404 has been actuated. The condition of the pressure switch 404 affects how or if the RFID tag 402 responds to the interrogation signal 112. This conditional aspect of the operation of the RFID pressure assembly 104 is illustrated at block 1008. If the pressure switch 404 is not actuated, the RFID tag 402 is in the inactive state 406. If the pressure switch 404 is actuated, the pressure switch 404 places the RFID tag 402 in the active state 408.

At block 1004, if the RFID tag remains in the inactive state, the RFID tag fails to respond to the interrogation signal. For example, if the RFID tag 402 is in the inactive state 406, the RFID tag 402 may refrain from sending out a response signal 114. The RFID tag 402 may, for instance, be incapable of being powered by the interrogation signal 112 if in the inactive state 406. Alternatively, the RFID tag 402 may be capable of being powered by the interrogation signal 112, but the RFID tag 402 refrains from the sending of a response signal 114 if in the inactive state 406, even if an integrated circuit 604 of the RFID tag 402 processes the interrogation signal 112.

At block 1006, if the RFID tag is in the active state, the RFID tag responds to the interrogation signal by sending a response signal to an appliance, with the response signal including an appliance control command to change an appliance setting. For example, if the RFID tag 402 is in the active state 408, the RFID tag 402 may respond to the interrogation signal 112 by sending a response signal 114 to an appliance 824, with the response signal 114 including an appliance control command 816 to change an appliance setting 826. The response signal 114 may include, for instance, a command to change a temperature setting of a thermostat, a command to change an on/off setting of a light or a fan, a command to play a particular genre of music for a speaker or sound system, and so forth.

Figure 11:
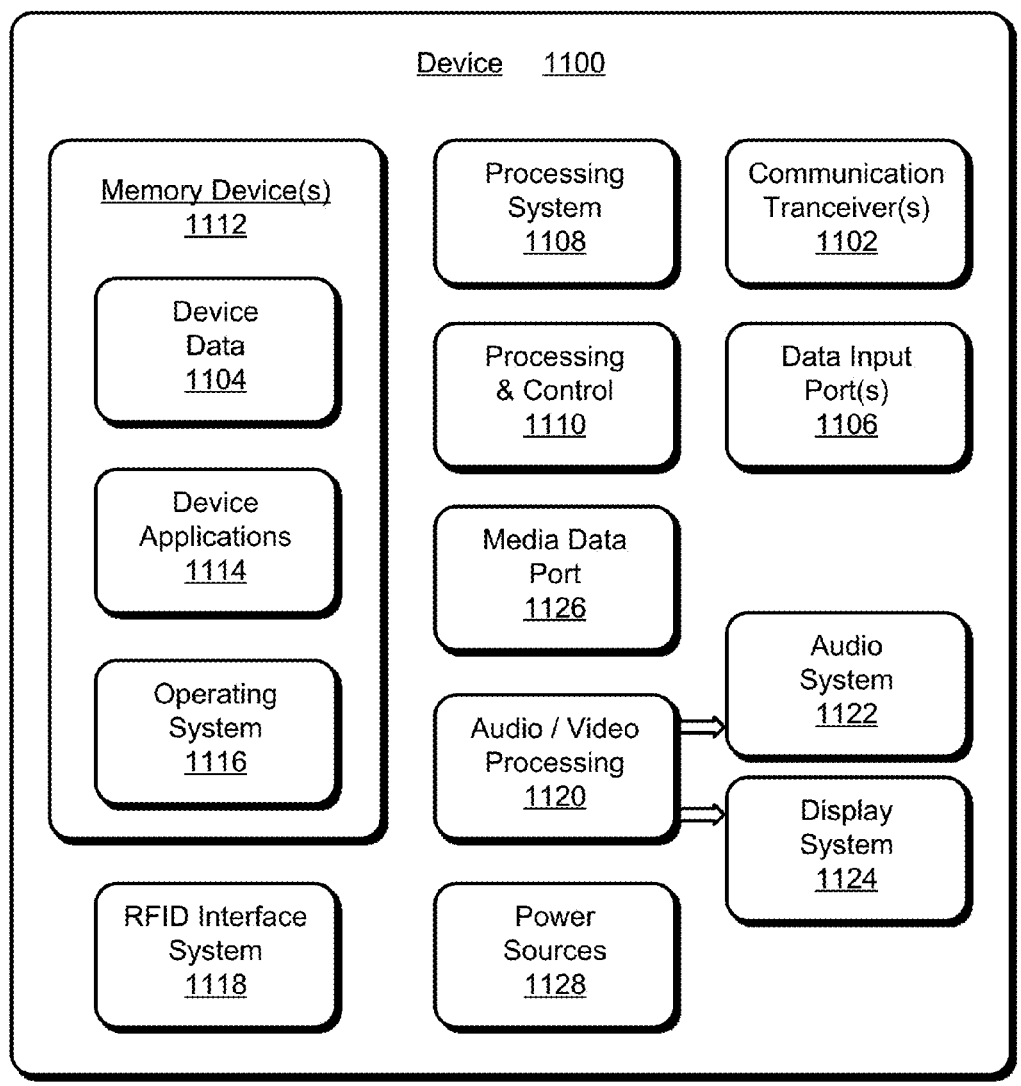
FIG. 11 illustrates various components of an example device that can implement embodiments of surface material enhancement with RFID tags.

FIG. 11 illustrates various components of an example device 1100 in which embodiments of surface material enhancement with RFID tags can be implemented. The example device 1100 can be implemented as any of the computing devices described with reference to the previous FIGS. 1-10, such as any type of client, mobile phone, tablet, computing, communication, entertainment, gaming, media playback, RFID reader, mobile programming unit, appliance, electronic, and/or other type of device. For example, the electronic device 108 that is shown in FIG. 1 or the RFID pressure assembly mobile programming unit 802 or the appliance 824 that are shown in FIG. 8 may be implemented as the example device 1100.

The device 1100 includes one or more communication transceivers 1102 that enable wired and/or wireless communication of device data 1104 with other devices. The device data 1104 can include any type of audio, video, and/or image data, as well as RFID or appliance-related data. Example transceivers 1102 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and RFID-related transceivers for interfacing with an RFID tag.

The device 1100 may also include one or more data input ports 1106 via which any type of data, media content, and/or inputs can be received, such as user selectable inputs to the device, messages, music, television content, recorded content, appliance settings, positional indicators, and any other type of audio, video, and/or image data received from any content and/or data source. The data input ports 1106 may include USB ports, coaxial cable ports, and other serial or parallel connectors (including internal connectors) for flash memory, DVDs, CDs, and the like. The data input ports 1106 may be used to couple the device to any type of components, peripherals, or accessories such as microphones and/or cameras.

The device 1100 includes a processing system 1108 of one or more processors (e.g., any of microprocessors, controllers, and the like) and/or a processor and memory system implemented as a system-on-chip (SoC) that processes computer-executable instructions. The processing system 1108 may be implemented at least partially in hardware, which can include components of an integrated circuit (IC) or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1110. The device 1100 may further include any type of a system bus or other data and command transfer system (not explicitly shown) that couples the various components within the device. A system bus can include any one or combination of different bus structures and architectures, as well as control and data lines.

The device 1100 also includes computer-readable storage memory 1112, which is illustrated as one or more memory devices 1112, that enable data storage, such as data storage devices that can be accessed by a computing device, and that provide persistent storage of data and executable instructions (e.g., software applications, programs, functions, and the like). Examples of the computer-readable storage memory 1112 include volatile memory and non-volatile memory, fixed and removable media devices, and any suitable memory device or electronic data storage that maintains data for computing device access. The computer-readable storage memory 1112 can include various implementations of random access memory (RAM), read-only memory (ROM), flash memory, and other types of storage media in various memory device configurations. The device 1100 may also include a mass storage media device.

The computer-readable storage memory 1112 provides data storage mechanisms to store the device data 1104, other types of information and/or data, and various device applications 1114 (e.g., software applications). For example, an operating system 1116 can be maintained as software instructions with a memory device and executed by the processing system 1108. The device applications 1114 may also include a device manager, such as any form of a control application, software application, signal-processing and control module, code that is native to a particular device, a hardware abstraction layer for a particular device, and so on. In this example, the device 1100 includes an RFID interface system 1118 that implements, or facilitates implementation of, embodiments of surface material enhancement with RFID tags, and that may be realized with hardware components and/or in software, such as when the device 1100 is implemented as the electronic device 108 that is described with reference to FIG. 1 or the RFID pressure assembly mobile programming unit 802 or the appliance 824 that are described with reference to FIG. 8. Examples of the RFID interface system 1118 include the RFID reader 110 that is implemented by the electronic device 108, the wireless interface 812 in conjunction with the RFID programmer 808 of the RFID pressure assembly mobile programming unit 802, and the wireless interface 828 of the appliance 824.

The device 1100 also includes an audio and/or video processing system 1120 that generates audio data for an audio system 1122 and/or generates display data for a display system 1124. The audio system 1122 and/or the display system 1124 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as a media data port 1126. In implementations, the audio system 1122 and/or the display system 1124 are integrated components of the example device. Alternatively, the audio system 1122 and/or the display system 1124 are external, peripheral components of the example device.

The device 1100 can also include one or more power sources 1128, such as when the device is implemented as a mobile device. The power sources 1128 may include a charging and/or power system, and can be implemented as a flexible strip battery, a rechargeable battery, a charged super-capacitor, and/or any other type of active or passive power source. With regard to terminology, unless context dictates otherwise, use herein of the word "or" may be considered use of an "inclusive or," or a term that permits inclusion or application of one or more items that are linked by the word "or" (e.g., a phrase "A or B" may be interpreted as permitting just "A," permitting just "B," or permitting both "A" and "B").

Although embodiments of surface material enhancement with RFID tags have been described in language specific to features and/or methods, the subject of the appended claims is not necessarily limited to the specific features or methods described. Rather, the specific features and methods are disclosed as example implementations of surface material enhancement with RFID tags, and other equivalent features and methods are intended to be within the scope of the appended claims. Further, various different embodiments are described and it is to be appreciated that each described embodiment can be implemented independently or in connection with one or more other described embodiments.

The invention claimed is:

1. A surface material, comprising: a radio frequency identification (RFID) pressure assembly including: an RFID tag having an active state and an inactive state, the RFID tag configured to fail to respond to an interrogation signal in the inactive state and to respond to the interrogation signal in the active state, the RFID tag including an antenna and an integrated circuit with a first antenna terminal and a second antenna terminal, the antenna coupled to the first antenna terminal; and a pressure switch coupled to the RFID tag, the pressure switch configured to respond to a pressure on the surface material implemented as a flooring surface material or a wall surface material, the pressure switch configured to maintain the RFID tag in the inactive state in an absence of the pressure and to switch the RFID tag into the active state in response to the pressure by completing the integrated circuit of the RFID pressure assembly by coupling the antenna to the second antenna terminal of the integrated circuit.

2. The surface material as recited in claim 1, wherein:
the pressure switch is configured to complete the integrated circuit of the RFID pressure assembly by coupling the antenna to the second antenna terminal of the integrated circuit in response to the pressure generated by a person on the flooring surface material or the wall surface material.

3. The surface material as recited in claim 1, wherein the integrated circuit is configured to store a positional indicator, the positional indicator comprising an indication of a distance to at least one structural feature of a building or to at least one geospatial or mapping coordinate.

4. The surface material as recited in claim 1, wherein the integrated circuit is configured to store a positional indicator, the positional indicator comprising an identification of a room of a building.

5. The surface material as recited in claim 1, wherein the integrated circuit is configured to respond to the interrogation signal by wirelessly sending a positional indicator via the antenna.

6. The surface material as recited in claim 1, wherein:
the pressure switch comprises a spring resistance that is configured to produce a bias force to prevent the integrated circuit of the RFID pressure assembly from being completed for the inactive state; and
the pressure switch is configured to complete the integrated circuit of the RFID pressure assembly for the active state responsive to the pressure if the pressure is sufficient to overcome the bias force.

7. The surface material as recited in claim 1, wherein:
the surface material further comprises multiple RFID pressure assemblies distributed over the flooring surface material in a spaced-apart arrangement.

8. The surface material as recited in claim 1, wherein the surface material further comprises multiple RFID pressure assemblies distributed over the wall surface material in a spaced-apart arrangement.

9. The surface material as recited in claim 1, wherein the integrated circuit of the RFID tag is configured to store an appliance control command.

10. The surface material as recited in claim 9, wherein the integrated circuit is further configured to respond to the interrogation signal by wirelessly sending the appliance control command to an appliance via the antenna.

11. A method for programming a radio frequency identification (RFID) pressure assembly, the method comprising:
applying a pressure to a mechanical pressure switch of an RFID pressure assembly that is installed with a flooring surface material or a wall surface material, a RFID tag of the RFID pressure assembly including an integrated circuit configured to couple to an antenna of the RFID tag; inducing the RFID tag of the RFID pressure assembly to enter an active state based on the pressure applied to the mechanical pressure switch, the pressure effective to complete the integrated circuit and couple the antenna to the integrated circuit in the active state; and causing the integrated circuit of the RFID tag to store a positional indicator in memory during the active state of the RFID tag.

12. The method as recited in claim 11, wherein:
the positional indicator comprises an identification of a room of a building, the room corresponding to an installation location of the RFID pressure assembly;
said applying comprises pressing, by a person, on the mechanical pressure switch of the RFID pressure assembly; and
said causing comprises using, by the person, an electronic device that includes an RFID programmer to transmit the positional indicator.

13. The method as recited in claim 11, wherein said applying, said inducing, and said causing are performed by an RFID pressure assembly mobile programming unit.

14. The method as recited in claim 11, wherein:
the positional indicator comprises an indication of a distance from an installation location of the RFID pressure assembly to at least one vertical structural feature of a building or to at least one geospatial or mapping coordinate; and
said causing comprises determining the distance from the installation location of the RFID pressure assembly to the at least one vertical structural feature of the building or to the at least one geospatial or mapping coordinate.

15. The method as recited in claim 14, wherein said determining comprises at least one of:
measuring the distance based on a signal reflection of a signal transmitted by an RFID pressure assembly mobile programming unit to the at least one vertical structure feature of the building; or
measuring the distance based on wheel travel of a wheel of the RFID pressure assembly mobile programming unit from the at least one vertical structural feature of the building or from the at least one geospatial or mapping coordinate.

16. The method as recited in claim 11, wherein:
said inducing comprises precipitating a switch of the RFID tag from an inactive state to the active state responsive to a triggering of the mechanical pressure switch, the active state configured to enable the integrated circuit of the RFID tag to perform a memory storage operation; and
said causing comprises transmitting the positional indicator to the RFID tag via a wireless signal while the RFID tag is in the active state.

17. A radio frequency identification (RFID) pressure assembly, comprising: a mechanical pressure switch integrated in a flooring surface material or in a wall surface material, the mechanical pressure switch configured to complete an integrated circuit based on pressure applied to the mechanical pressure switch; and an RFID tag that is coupled to the mechanical pressure switch and configured to switch from an inactive state to an active state if the integrated circuit is completed by the mechanical pressure switch, the RFID tag including the integrated circuit that couples to an antenna of the RFID tag in the active state responsive to the pressure applied to the mechanical pressure switch, the RFID tag configured to: receive an interrogation signal; if in the inactive state, fail to respond to the interrogation signal; and if in the active state, respond to the interrogation signal by sending a response signal to an appliance, the response signal including an appliance control command to change an appliance setting.

18. The RFID pressure assembly as recited in claim 17, wherein:
   the RFID tag includes a memory; and
   the RFID tag is further configured to:
      receive an interrogation signal that includes the appliance control command;
      if in the inactive state, fail to respond to the interrogation signal that includes the appliance control command; and
      if in the active state, respond to the interrogation signal by storing the appliance control command in the memory of the RFID tag.

19. The RFID pressure assembly as recited in claim 17, wherein the appliance control command is formulated as an instruction to change the appliance setting, the instruction interpretable by the appliance.

20. The RFID pressure assembly as recited in claim 17, wherein:
   the mechanical pressure switch includes a mechanical spring that is configured to produce a bias force for the mechanical pressure switch; and
   the mechanical pressure switch is configured to maintain the RFID tag in the inactive state in the absence of the pressure based on the bias force.

* * * * *